United States Patent [19]

Ito et al.

[11] Patent Number: 5,612,793
[45] Date of Patent: Mar. 18, 1997

[54] IMAGE PROCESSING APPARATUS AND METHOD WHICH PERFORMS PATTERNING OF COLOR DATA TO GENERATE A PATTERN IMAGE

[75] Inventors: Akio Ito, Machida; Hiroyuki Ichikawa, Kawasaki; Yoshinori Abe, Tama; Shoji Miyake, Tokyo, all of Japan

[73] Assignee: Canon Kabushiki Kaisha, Tokyo, Japan

[21] Appl. No.: 609,864

[22] Filed: Mar. 4, 1996

Related U.S. Application Data

[63] Continuation of Ser. No. 25,754, Mar. 3, 1993, abandoned.

[30]   Foreign Application Priority Data

Mar. 5, 1992 [JP] Japan .................................. 4-083495
Mar. 1, 1993 [JP] Japan .................................. 5-064645

[51] Int. Cl.⁶ .............................. H04N 1/56; H04N 1/46
[52] U.S. Cl. ...................... 358/500; 358/522; 358/530; 382/162; 382/168
[58] Field of Search ................... 358/522, 534, 358/462, 518, 500, 501, 530; 382/162, 167, 168

[56]   References Cited

U.S. PATENT DOCUMENTS 5,321,532   6/1994   Ishikawa et al. ............... 358/534

FOREIGN PATENT DOCUMENTS

| 337325 | 10/1989 | European Pat. Off. ........ G06F 15/70 |
| 422544 | 4/1991 | European Pat. Off. ......... H04N 1/46 |
| 435658 | 7/1991 | European Pat. Off. ......... H04N 1/46 |
| 446008 | 9/1991 | European Pat. Off. ......... H04N 1/40 |
| WO87/02852 | 5/1987 | WIPO ............................ H04N 1/40 |

OTHER PUBLICATIONS

Institute of Electronics, Information and Communication Engineers Technical Report, IE89–43 – 50, "A region Splitting Method by Using Color Information", p. 43, Takashi Miyawaki, et al., Sep. 19, 1989.

*Primary Examiner*—Scott A. Rogers
*Attorney, Agent, or Firm*—Fitzpatrick, Cella, Harper & Scinto

[57]   ABSTRACT

An image processing apparatus includes an image processing unit, a counter, and a determining unit. The image processing unit processes image data between first and second color values of an input image. The counter counts generation frequencies of the respective color values of the input image. The determining unit determines the first and second color values on the basis of the count result obtained by the counter.

29 Claims, 14 Drawing Sheets

LOW ORDER ADDRESS

|   | 0 | 1 | 2 | 3 | 4 | 5 | 6 | 7 |
|---|---|---|---|---|---|---|---|---|
| 0 | 1 | 0 | 1 | 0 | 1 | 0 | 1 | 0 |
| 1 | 0 | 1 | 0 | 1 | 0 | 1 | 0 | 1 |
| 2 | 1 | 0 | 1 | 0 | 1 | 0 | 1 | 0 |
| 3 | 0 | 1 | 0 | 1 | 0 | 1 | 0 | 1 |
| 4 | 1 | 0 | 1 | 0 | 1 | 0 | 1 | 0 |

HIGH ORDER ADDRESS

IMAGE PROCESSING APPARATUS AND METHOD WHICH PERFORMS PATTERNING OF COLOR DATA TO GENERATE A PATTERN IMAGE

This application is a continuation of application Ser. No. 08/025,754 filed Mar. 3, 1993, now abandoned.

BACKGROUND OF THE INVENTION

1. Field of the Invention

The present invention relates to an image processing apparatus for processing a color image, and an image processing method thereof.

2. Description of Related Art

The following image reproduction function has recently been proposed in a digital copying machine, an image scanner, a facsimile apparatus, and the like. First the color information of an original is converted into color signals by a photoelectric conversion element such as a color CCD or the like. Areas which are determined, on the basis of these color signals, to have the same color are replaced with a predetermined pattern such as a dot, horizontal line, or wavy line pattern corresponding to the color. This pattern is then reproduced in a single color to reproduce a monochrome image, thereby realizing a visual effect similar to that obtained by reproducing a color image.

In patterning color data, however, since color boundaries for patterning are fixed, the following problem is posed. If a portion of an image on an original has a color close to a boundary, the image is converted into two patterns because of the gradation of the color of the image, resulting in a poor processing result.

SUMMARY OF THE INVENTION

It is an object of the present invention to solve the above problem.

It is another object of the present invention to provide an image processing apparatus which can perform patterning of color data to generate a beautiful, easy-to-see pattern image.

It is still another object of the present invention to provide an image processing apparatus which can automatically determine a color range to be image-processed.

The above and other objects, features, and advantages of the present invention will be apparent from the following detailed description in conjunction with the accompanying drawings and the appended claims.

DETAILED DESCRIPTION OF THE PREFERRED EMBODIMENT

An embodiment of the present invention will be described below with reference to the accompanying drawings.

Figure 1:
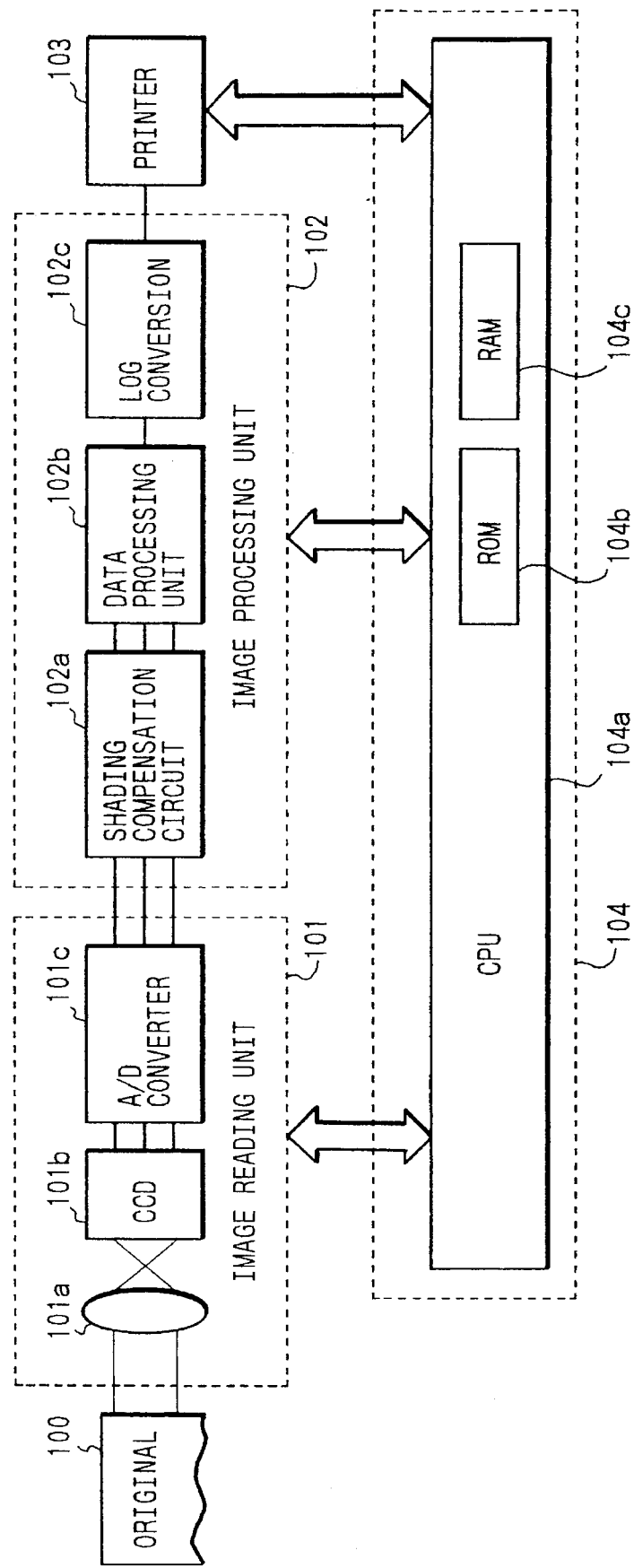
FIG. 1 is a block diagram showing a copying machine according to an embodiment of the present invention.

FIG. 1 is a block diagram showing a digital copying machine according to the embodiment of the present invention. A full-color original 100 is illuminated by a lamp (not shown). In an image reading unit 101, the full-color image is then formed on the light-receiving surface of a color CCD sensor 101b by a lens 101a, and the R (red), G (green), and B (blue) image data of each line of the image are read as analog signals, respectively, at a rate of 400 dpi, for example. The read signals are converted into digital signals by an A/D converter 101c. The digital signals are then sent from the image reading unit 101 to an image processing unit 102.

In the image processing unit 102, the R, G, and B digital signals are corrected by a shading compensation circuit 102a in accordance with the light amount irregularity of the lamp, the sensitivity error of the color CCD sensor 101b with respect to each pixel, and the like, thus obtaining respective 8-bit R, G, and B digital signals. Subsequently, in a data processing unit 102b, the colors of the image data are discriminated on the basis of these digital signals, and are converted into patterns corresponding to the respective colors. The respective patterns are converted into density data by a LOG conversion unit 102c to be reproduced as a monochrome image by a printer 103.

The printer 103 includes a circuit for controlling, e.g., a motor for conveying a transfer sheet, a laser recording portion for writing image data from the image processing unit 102 on a photosensitive drum, and a developing control circuit for developing an image in monochrome. In addition, a CPU circuit unit 104 includes a CPU 104a, a ROM 104b, and a RAM 104c. The CPU circuit unit 104 controls the overall copying sequence of the digital copying machine by controlling the image reading unit 101, the image processing unit 102 and, the printer 103.

Figure 2:
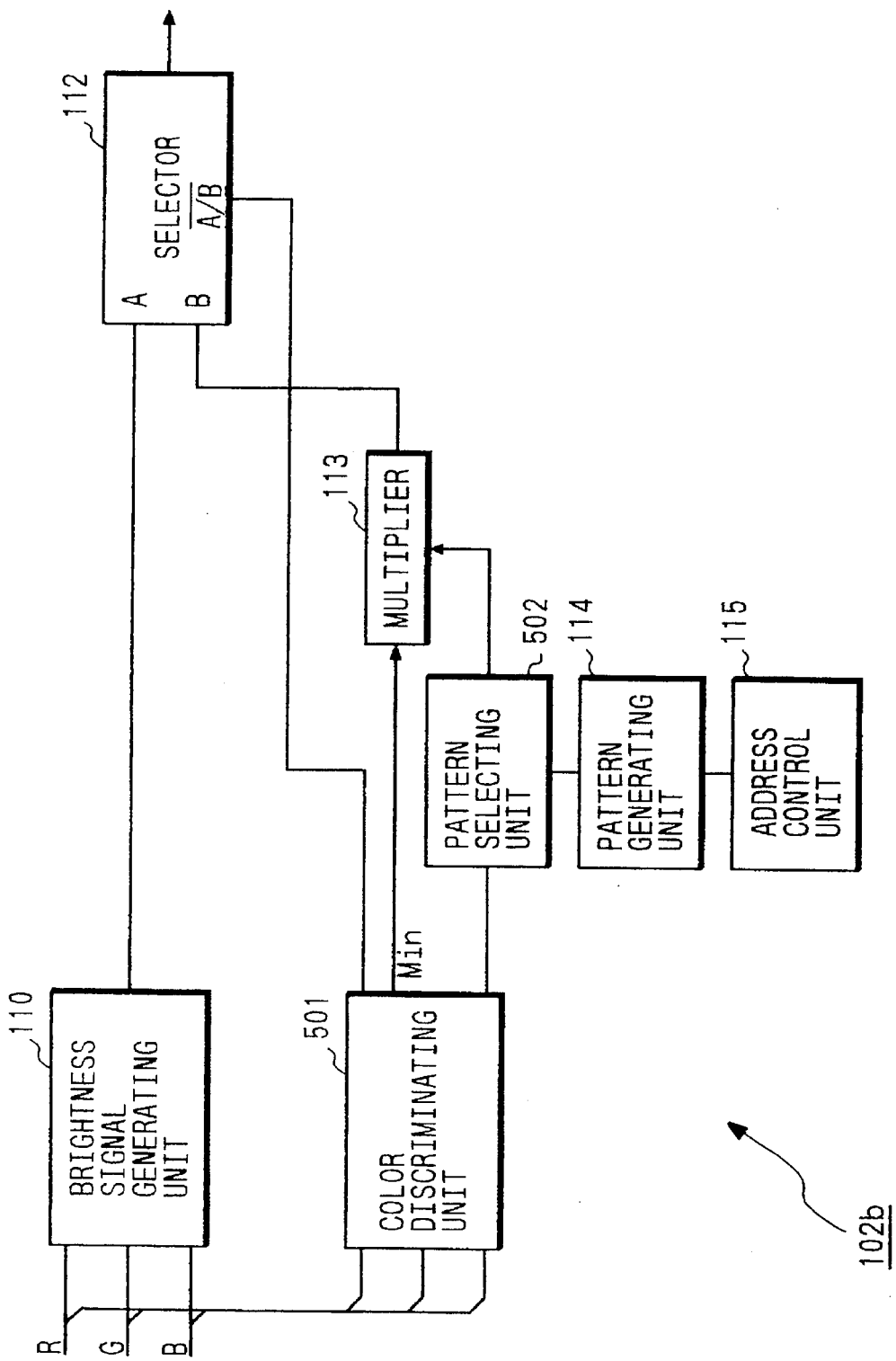
FIG. 2 is a block diagram showing details of a data processing unit 102b of FIG. 1.

FIG. 2 is a block diagram of the data processing unit 102b. A brightness signal generating unit 110 generates non-color-separated image data throughout the entire wavelength region, i.e., monochrome brightness data Dout, from the color-separated R, G, and B signals from the image reading unit 101. This data is then input to an input terminal A of a selector 112. Note that the brightness signal generating unit 110 generates the brightness data Dout by calculating the averages of the R, G, and B data using, e.g., an adder and a multiplier.

Figure 3:
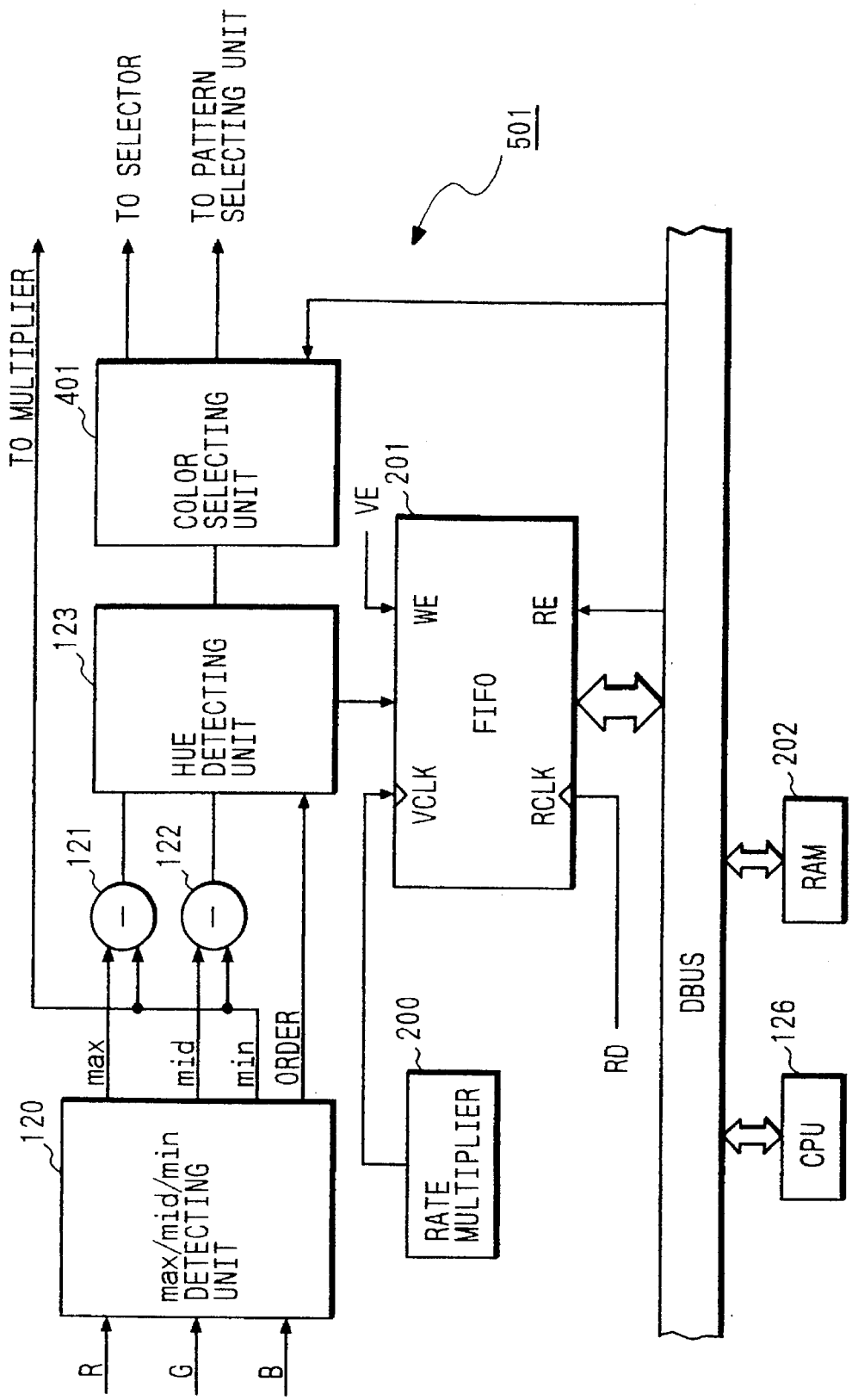
FIG. 3 is a block diagram showing details of a color discriminating unit 501 of FIG. 2.

As shown in detail in FIG. 3, the color discriminating unit 501 (FIG. 2) detects color components of the color original 100 by using a hue signal in order to reproduce the color image in monochrome patterns. In this case, the hue signal is used to accurately discriminate colors even if identical colors differ in vividness and brightness. Strictly speaking, the meaning of the word "hue" used in the following description is different from the general meaning of the word.

R, G, and B data input to the color discriminating unit 501 respectively consist of 8-bit data and are data having a total of $2^{24}$ colors. Since direct processing of such a large amount of data requires a large-scale, expensive circuit, the following processing is performed. A max/mid/min detecting unit 120 compares the R, G, and B data through comparators to obtain values max (maximum values), values mid (middle values), and values min (minimum values), and outputs corresponding order signals. The values min are output to a multiplier 113 shown in FIG. 2.

Figure 4:
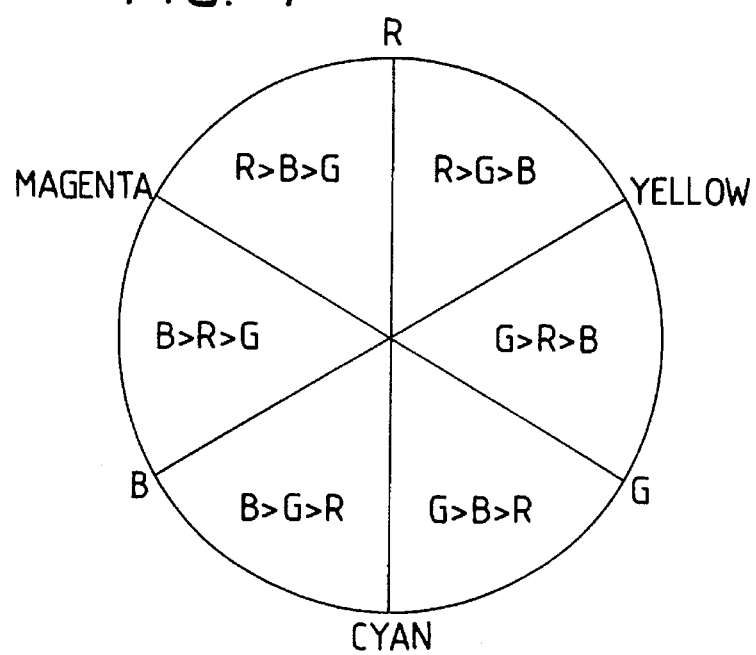
FIG. 4 is a chart for describing a color plane.

As is known in the Munsell system or the like, a color space is represented by saturation, lightness, and hue. First, R, G, and B data need to be converted into plane data, i.e., two-dimensional data. In this case, since the common portions of R, G, and B data, i.e., minimum values min (R, G, B) of the R, G, and B data, are achromatic components, the data min (R, G, B) are respectively subtracted from the respective color data, and the remaining data are used as chromatic components (subtracters 121 and 122 in FIG. 3). As shown in FIG. 4, the plane data obtained by such conversion is a 0°–360° plane which is divided into six sectors respectively representing color data based on the orders of the magnitudes of the R, G, and B data, i.e., R>G>B, R>B>G, G>B>R, G>R>B, B>G>R, and B>R>G. As a result, each 8-bit data is converted into a two-dimensional color space.

A hue detecting unit 123 outputs hue values corresponding to values (max−min) from the subtracter 121, values (mid−min) from the subtracter 122, and order signals from the max/mid/min detecting unit 120. As such hue values, values ranging from "0" to "239", with blue (B) serving as a start point in FIG. 4, are output to a FIFO memory 210. An achromatic component has a relatively small value (max−min). If, therefore, a value (max−min) is smaller than a certain value, a hue value other than "0" to "239" is output, thereby forming a histogram of only chromatic components, as will be described later.

A rate multiplier 200 is designed to output a signal once per 16 pixels in the main scanning direction of the original 100 and output a signal once per 16 lines in the sub scanning direction. Therefore, one hue value from the hue detecting unit 123 is loaded in the FIFO memory 210 per 16×16 pixels. The hue values loaded in the FIFO memory 210 in this manner are sequentially read out by a CPU 126 on the basis of a program pre-stored in the ROM 104*b* shown in FIG. 1. The read values ranging from "0" to "239" are respectively accumulated from a histogram. The histogram is then loaded in a RAM 202.

Figure 5:
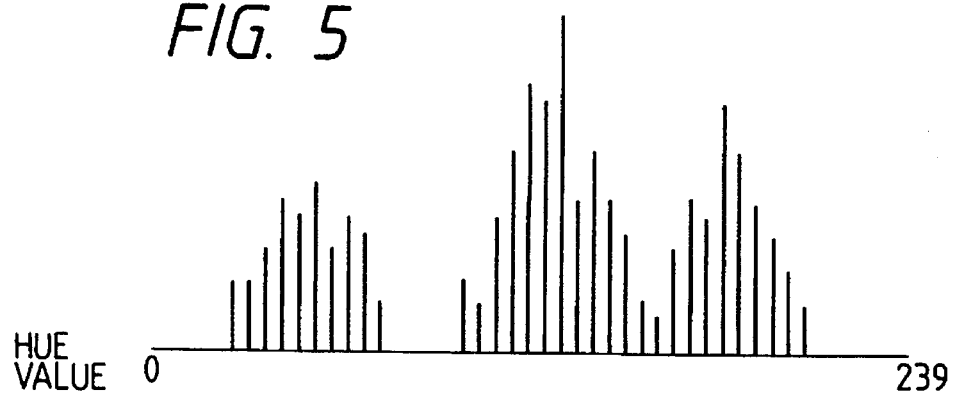
FIG. 5 is a graph for describing a histogram of hue values.

If the accumulation data are represented by a [0] to a [239], since the hue values of this histogram are discretely distributed, as shown in FIG. 5, it is difficult to determine threshold values from the histogram. For this reason, in the embodiment, smoothing processing is performed with respect to such data according to the following equation:

$$a[i]=(a[i-2]+a[i-1]+a[i]+a[i+1]+a[i+2])/5$$

where $0 \leq i < 240$.

Figure 6:
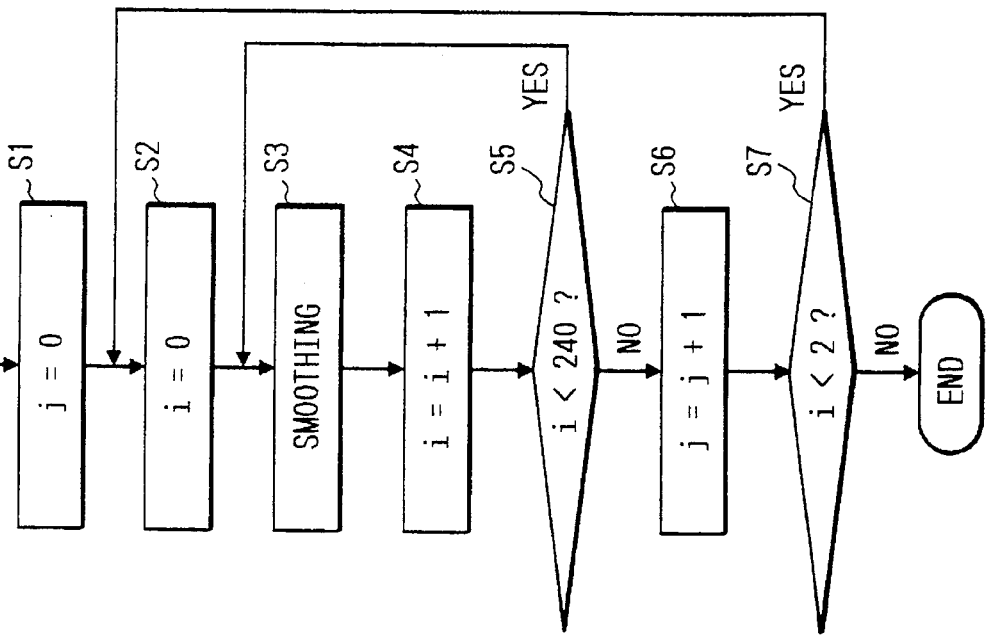
FIG. 6 is a flow chart showing a procedure for smoothing processing.

Since the changes in hue value are still coarse after one smoothing operation, smoothing is performed twice in the embodiment to form a histogram representing smooth changes in hue value, as shown in FIG. 6. More specifically, in step S1 shown in FIG. 6, a smoothing operation counter i is reset to 0. In step S2, a hue value counter i is reset to 0. In step S3, smoothing is performed according to the above equation. In the loop of steps S3 to S5, the first smoothing operation is performed with respect to values i ranging from "0" to "239". Assume that in the above equation, a[−2]=a[238], a[−1]=a[239], a[240]=a[0], and a[241]=a[1].

Figure 7:
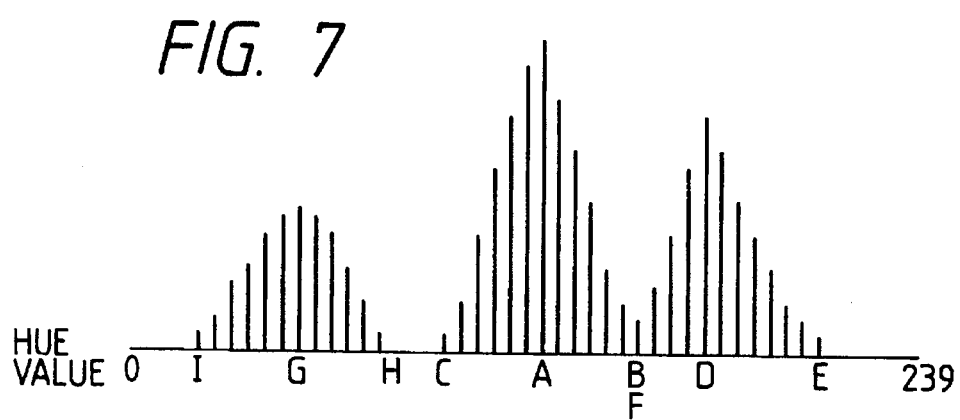
FIG. 7 is a graph showing a histogram obtained after smoothing processing.

In step S6, the smoothing operation counter i is incremented. In the loop of steps S2 to S7, the second smoothing operation is performed. FIG. 7 shows a histogram obtained by performing smoothing processing twice. In this embodiment, hue values at points A to I are obtained from this smoothed histogram, as shown in FIG. 7.

Figure 8:
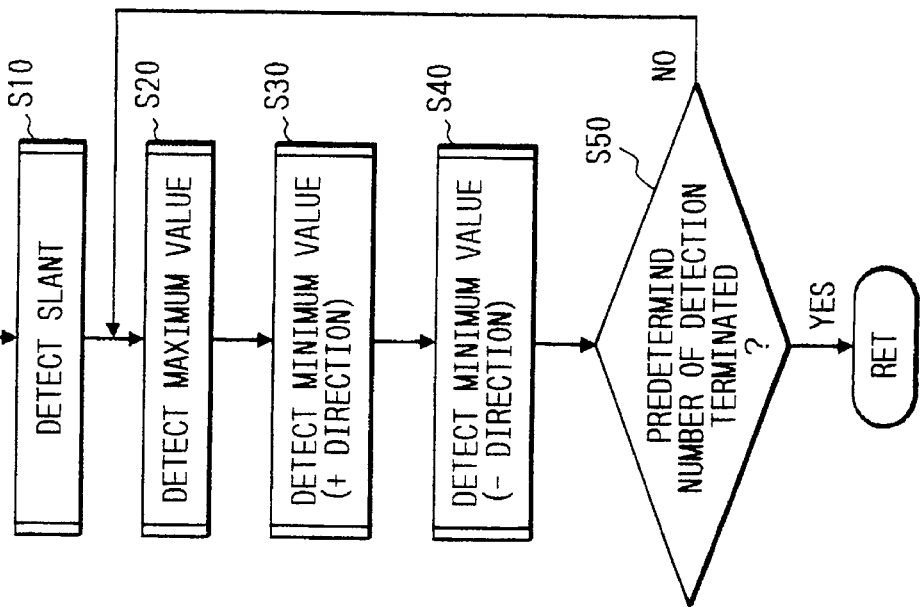
FIG. 8 is a flow chart showing a procedure for determining threshold values.
Figure 10:
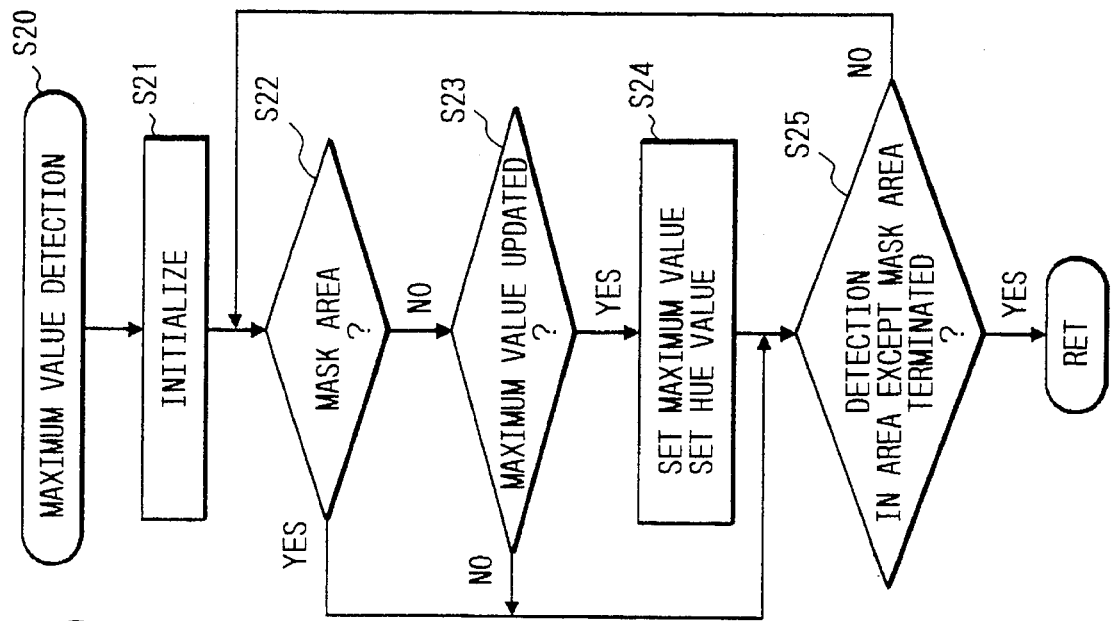
FIG. 10 is a flow chart showing a procedure for maximum value detection.
Figure 9:
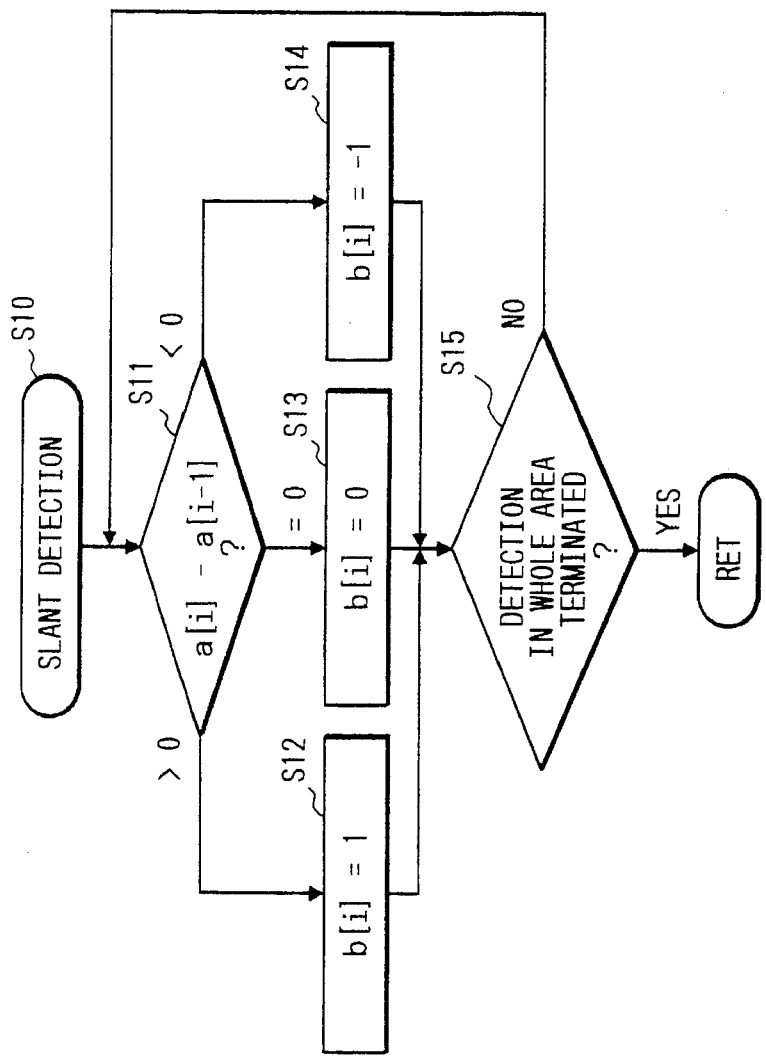
FIG. 9 is a flow chart showing a procedure for slant detection.
Figure 11:
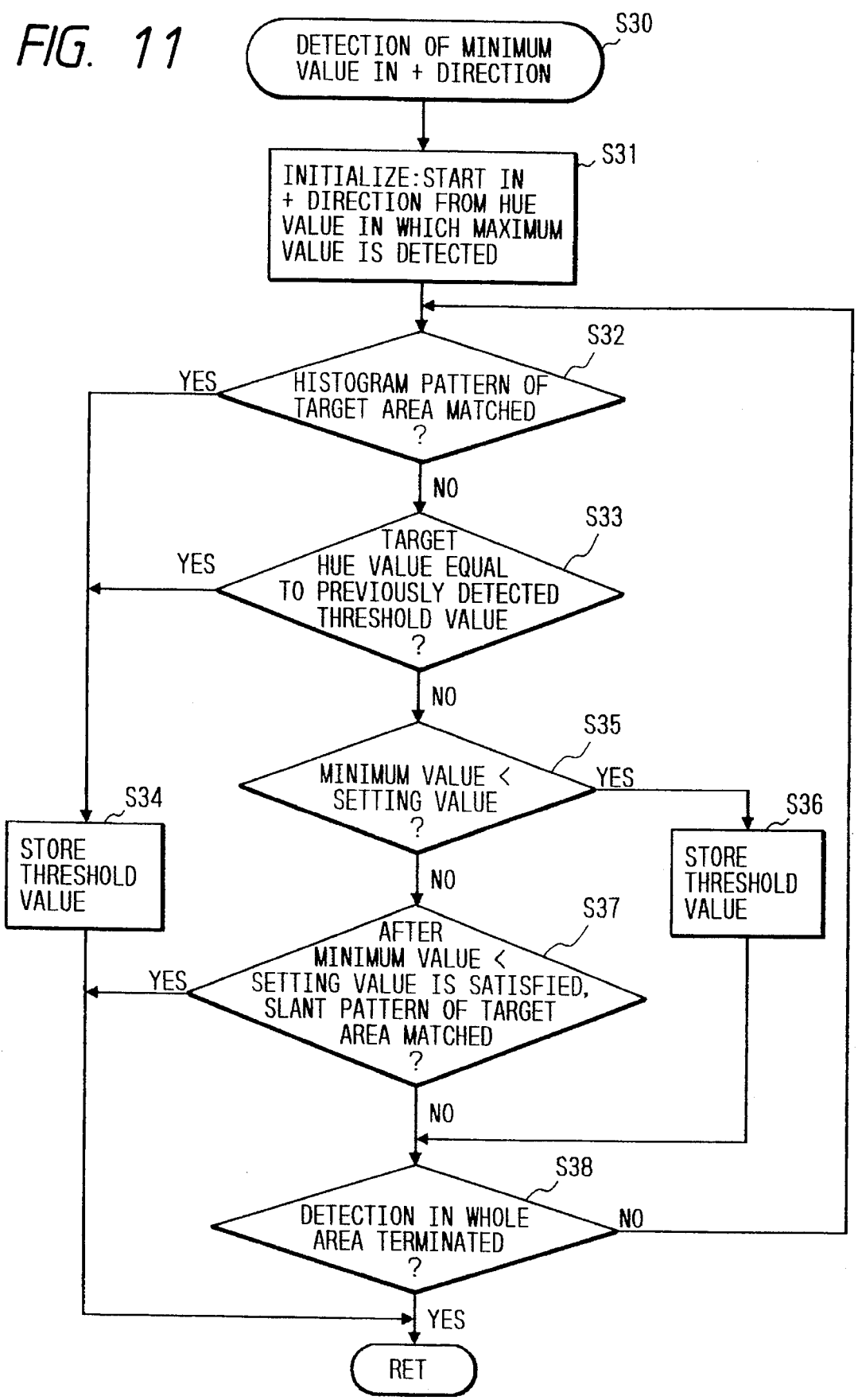
FIG. 11 is a flow chart showing a procedure for detecting a minimum value in the + direction.
Figure 12:
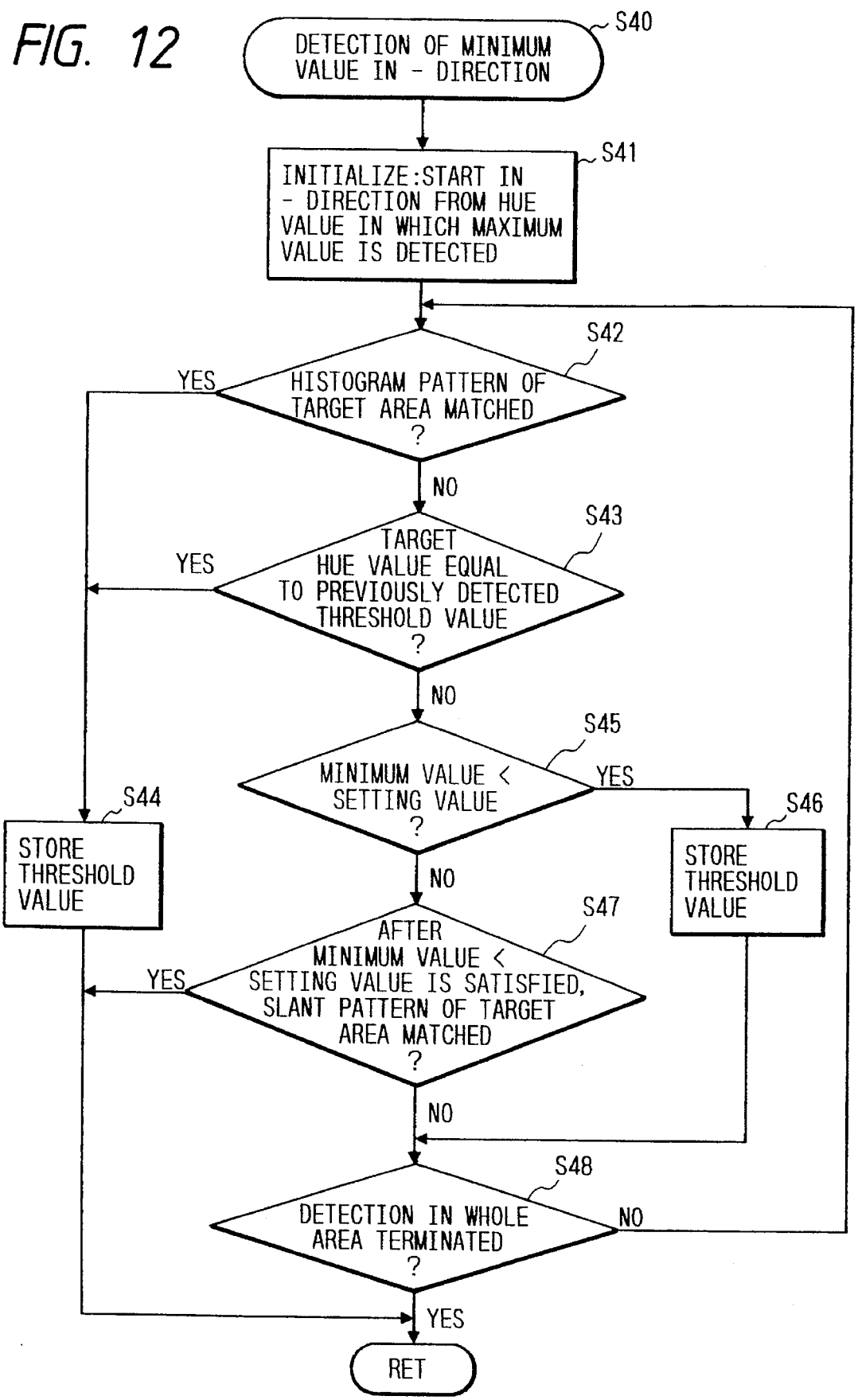
FIG. 12 is a flow chart showing a procedure for detecting a minimum value in the − direction.

FIG. 8 is a flow chart showing an outline of a procedure for determining threshold values. FIG. 9 is a flow chart showing a detailed procedure for slant detection S10 in FIG. 8. FIG. 10 is a flow chart showing a detailed procedure for maximum value detection S20 in FIG. 8. FIG. 11 is a flow chart showing a detailed procedure for minimum value detection in the + direction S30 in FIG. 8. FIG. 12 is a flow chart showing a detailed procedure for minimum value detection in the − direction S40 in FIG. 8. In step S10 shown in FIG. 8, the slant of each hue value is obtained. In step S20, the maximum value of the hue values is obtained. In step S30, the minimum value of the hue values in the + direction is obtained. In step S40, the minimum value of the hue values in the − direction is obtained. If it is determined in step S50 that detection has not been performed a predetermined number of times, the flow returns advances to step S20. If detection has been performed the predetermined number of times, the processing is ended.

According to the procedure for slant detection shown in FIG. 9, a slant b[i] of a hue value i (=[0] to [239]) is obtained as follows:

If $a[i]-a[i-1]>0$, then $b[i]=1$ (S11, S12)

If $a[i]-a[i-1]=0$, then $b[i]=0$ (S11, S13)

If $a[i]-a[i-1]<0$, then $b[i]=-1$ (S11, S14) where $0 \leq i < 240$.

When the slants b[i] in the whole area of the histogram are obtained, the flow advances from step S15 to step S20 in FIG. 10. In the procedure for maximum value detection shown in FIG. 10, the respective parameters are initialized in step S21. With the first detection, a maximum value a[A] of a[0] to a[239] is obtained (steps S22 to S25). In this case, therefore, the maximum value a [A] is the hue value at a position A. A procedure for the second and subsequent maximum value detections will be described later.

In the procedure for minimum value detection in the + direction shown in FIG. 11, the respective parameters are initialized in step S31. Subsequently, the hue value is changed in the + direction from the hue value at the position A, at which the maximum value a[A] is detected in step S20 in FIG. 10, as a start point, and the hue value which satisfies one of the following three conditions first is obtained and detected as a threshold value.

The first condition is that matching of histogram patterns in target areas (i−2), (i−1), (i), (i+1), and (i+2) of hue values is performed as follows (step S32):

$a[i-2] \neq 0, a[i-1] \neq 0, a[i]=0, a[i+1]=0, a[i+2]=0$

The hue value i which satisfies this condition is stored as a temporary threshold value (step S34).

The second condition is that when a target hue value is equal to the previously detected threshold value, the corresponding hue value i is stored as a temporary threshold value (steps S33 and S34). The third condition is that when an accumulation value a[i] is smaller than a setting value a (step S35), the corresponding hue value i is stored as a temporary threshold value (step S36). After the above-described condition is satisfied, matching of slant patterns in the target areas (i−2), (i−1), (i), (i+1), and (i+2) of the hue values is performed as follows (step S37):

$b[i-2] \neq -1, b[i-1] \neq -1, b[i] \neq -1, b[i+1] \neq -1, b[i+2] \neq -1$

When this slant pattern matching condition is satisfied, the hue value stored in step S34 or S36 is obtained as a threshold value. In this case, the hue value at a position B is set as a threshold value.

In the procedure for minimum value detection in the − direction shown in FIG. 12, the respective parameters are initialized in step S41. Subsequently, the hue value is changed in the − direction from the hue value at the position A, at which the maximum value a [A] is detected in step S20 in FIG. 10, as a start point, and the hue value which satisfies one of the following three conditions first is obtained and detected as a threshold value.

The first condition is that matching of histogram patterns in target areas (i−2), (i−1), (i), (i+1), and (i+2) of hue values is performed as follows (step S42):

$a[i-2]=0, a[i-1]=0, a[i]=0, a[i+1] \neq 0, a[i+2] \neq 0$

The hue value i which satisfies this condition is stored as a temporary threshold value (step S44).

The second condition is the same as that in the procedure for minimum value detection in the + direction. Therefore, when a target hue value is equal to the previously detected threshold value, the corresponding hue value i is stored as a temporary threshold value (steps S43 and S44). The third condition is that when the accumulation value a[i] is smaller than the setting value α (step S45), the corresponding hue value i is stored as a temporary threshold value (step S46). After the above-described condition is satisfied, matching of slant patterns in the target areas (i−2), (i−1), (i), (i+1), and (i+2) of the hue values is performed as follows (step S47):

$b[i-2] \neq 1, b[i-1] \neq 1, b[i] \neq 1, b[i+1] \neq 1, b[i+2] \neq 1$

When this slant pattern matching condition is satisfied, the hue value stored in step S44 or S46 is obtained as a threshold value. In this case, the hue value at a position C is set as a threshold value.

In the second procedure for maximum value detection shown in FIG. 10, the respective parameters are initialized in step S20. Thereafter, in step S21, the area between the threshold values obtained in the above-described manner is masked. More specifically, the area between the positions B and C is masked, and a maximum value a[D] of a[0] to a[C−1] and a[B+1] to a[239] is obtained (step S22 to S24). Subsequently, in steps S30 and S40, the hue values at positions E and F, at which the hue value is minimized in the + direction and the − direction, with a position D of the obtained maximum value a[D] being regarded as the center, are obtained as threshold values. In addition, in the third procedure for maximum value detection, the maximum value at a position G and the hue values at minimum value positions H and I corresponding to the position G are obtained as threshold values. This threshold value determination processing is performed a predetermined number of times.

Figure 13:
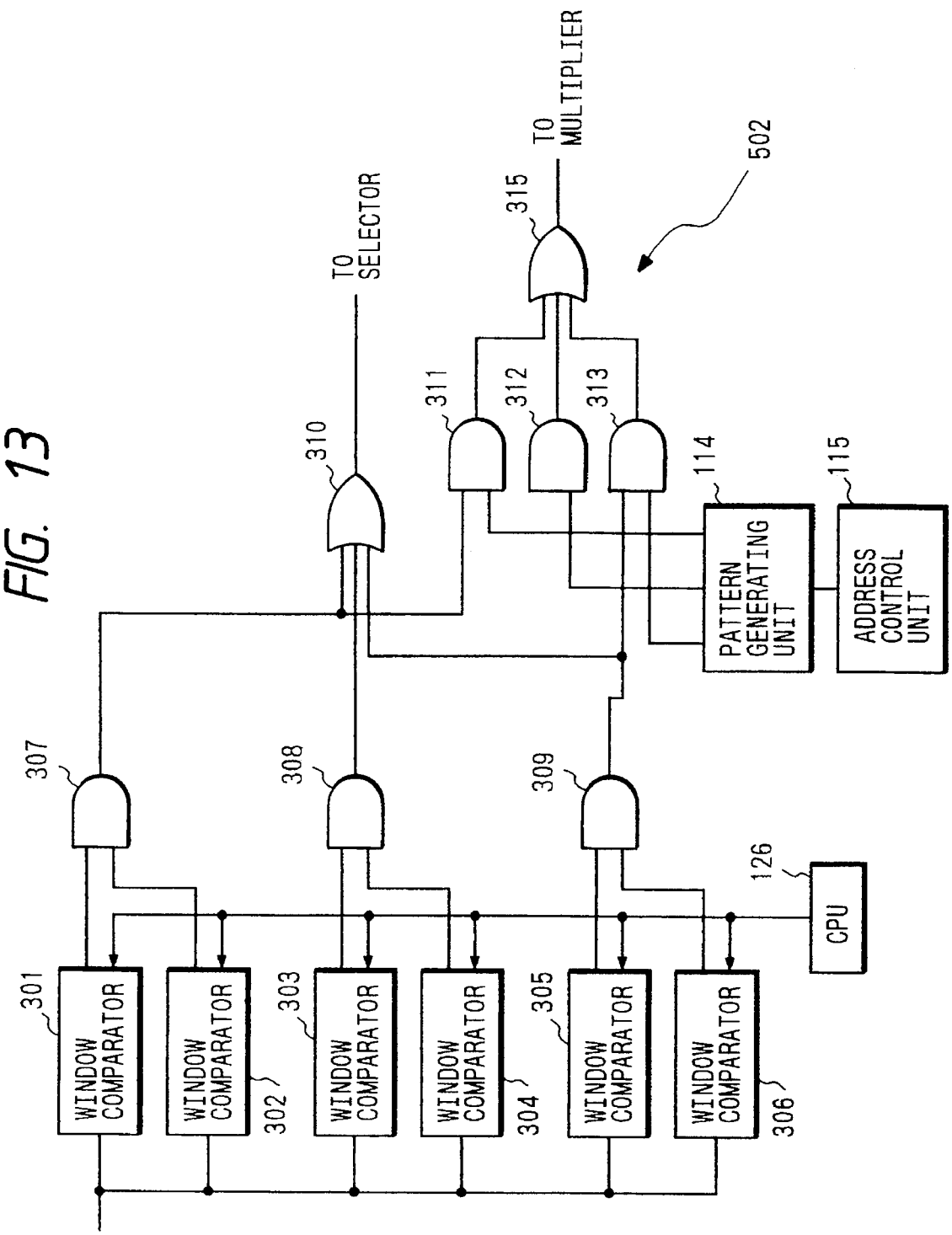
FIG. 13 is a block diagram showing details of a pattern selecting unit 502 of FIG. 2.

The threshold values at the positions C, B, F, E, I, and H are respectively set in window comparators 301 to 306 for color selection (FIG. 3), in the order named by the CPU 126, as shown in FIG. 13. More specifically, the threshold values in the largest area 10 between the positions C and B, the threshold values in the second largest area between the positions F and E, and the threshold values in the third largest area between the positions I and H are respectively set in the window comparators. When the original 100 is read by the second scan operation, a hue signal from the hue detecting unit 123 is input to a color selecting unit 401. If the hue value of the hue signal is larger than the threshold value at the position C and is smaller than the threshold value at the position B, i.e., falls in the range of the hue values between the positions B and C, both the window comparators 301 and 302 output "1", while an output from a corresponding AND gate 307 is set at "1". Similarly, if the hue value of the hue signal falls in the range of hue values between the positions E and F, both outputs from the window comparators 303 and 304 are set at "1", while an output from an AND gate 308 is set at "1". If the hue value of the hue signal falls in the range of the hue values between the positions H and I, both outputs from the window comparators 305 and 306 are set at "1", while an output from an AND gate 309 is set at "1".

When one of the output signals from the AND gates 307 to 309 is set at "1", an output from an OR gate 310 is set at "1". The selector 112 shown in FIG. 2 then selects the pattern signal from the multiplier 113 in accordance with the output from the OR gate 310. Pattern data from a pattern generating unit 114 is selected by the output signals from the AND gates 307 to 309 and AND gates 311 to 313. The pattern data is then output to the multiplier 113 in FIG. 2 through an OR gate 315 to be multiplied by the darkest signals min (R, G, B) from the color separating unit 501. The resultant data is output to an input terminal B of the selector 112.

Figure 14:
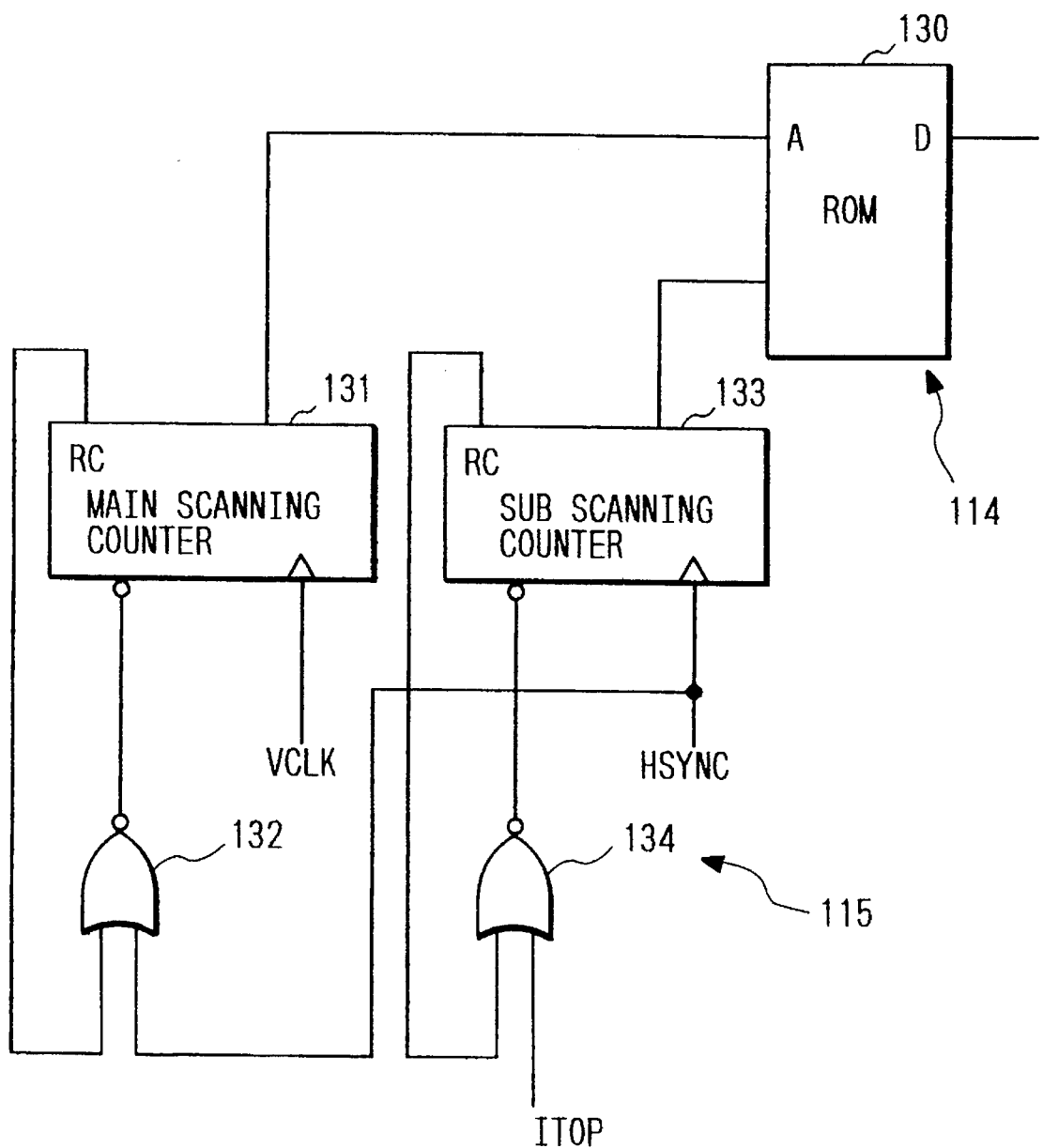
FIG. 14 is a block diagram showing details of a pattern generating unit 114 and an address control unit 115 of FIG. 2.
Figures 15A, 15B:
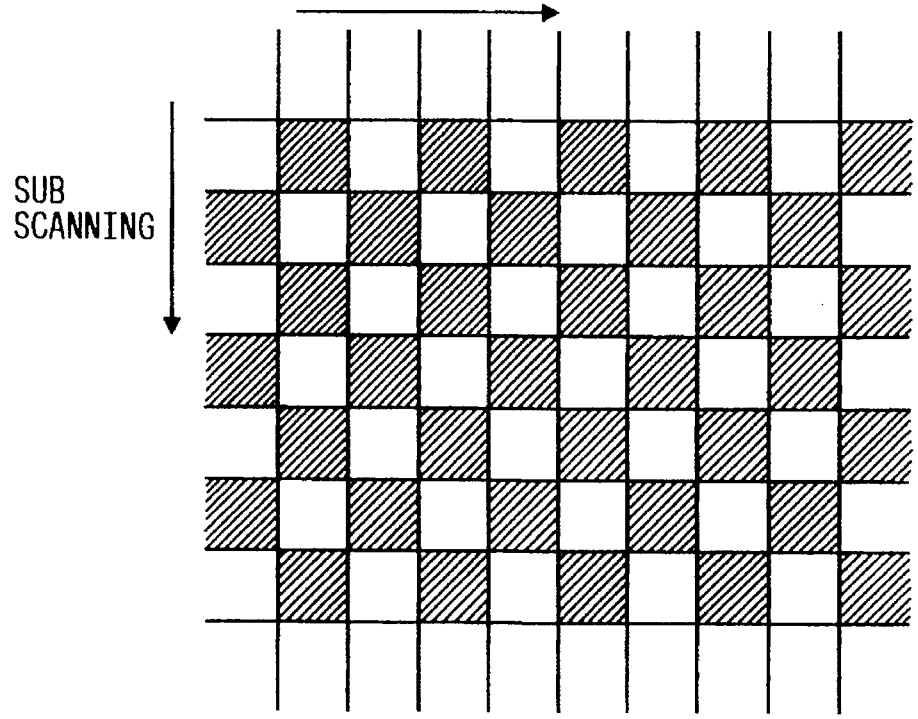
FIGS. 15A and 15B are views for describing pattern data stored in a ROM 130 of FIG. 14.

FIG. 14 shows the detailed arrangement of the pattern generating unit 114 and an address control unit 115 in FIG. 13. The pattern generating unit 114 is constituted by a ROM 130 in which dot data for patterns are pre-stored at addresses constituted by high order addresses and low order addresses, as shown in FIGS. 15A and 15B. The address control unit 115 generates a read address of the ROM 130.

Figure 16:
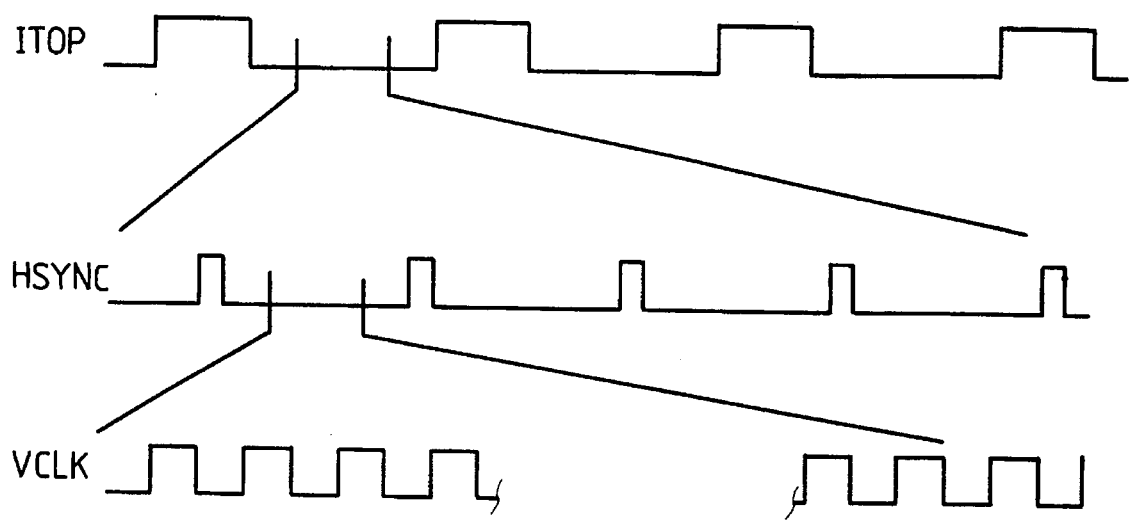
FIG. 16 is a timing chart of the address control unit 115 of FIG. 13.

A main scanning counter 131 of the address control unit 115 counts the pulses of a pixel count signal VCLK in synchronism with a horizontal sync signal HSYNC, and generates a high order address of the ROM 130, as shown in FIG. 16. A sub scanning counter 133 counts the pulses of the horizontal sync signal HSYNC in synchronism with a signal ITOP which is set at low level while the image reading unit 101 shown in FIG. 1 reads the original 100, thus generating a low order address of the ROM 130.

The multiplier 113 in FIG. 2 multiplies the minimum value signals, i.e., the darkest signals min (R, G, B) from the color discriminating unit 501 and the dot data read out from the ROM 130, and outputs the resultant data to the input terminal B of the selector 112. The darkest signals min (R, G, B) are used for the following reason. The level of the brightness signal Dout generated from an ND signal varies depending on the color. For example, the level of a yellow signal is close to that of a white signal. In this case, if brightest signals max (R, G, B) are used, image data of the original 100 is omitted.

Figure 17:
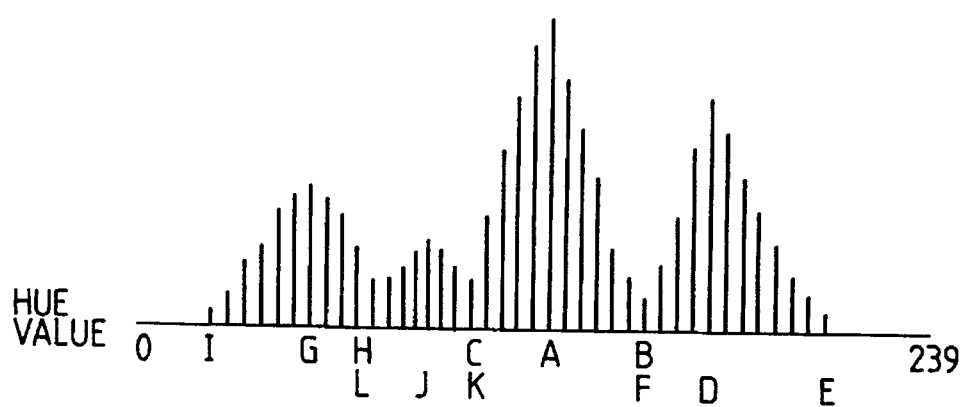
FIG. 17 is a graph for describing a histogram of hue values.

In this embodiment, patterning is performed with respect to three hue ranges, i.e., ranges having three peaks, in a histogram. If, however, a hue value histogram of an original image has four peaks, as shown in FIG. 17, patterning is not performed with respect to a hue range between positions L and K, although patterning is performed with respect to hue ranges between positions C and B, positions F and E, and positions I and H. Another embodiment for solving such a problem will be described below. In this embodiment, although only three patterns can be generated, patterning can be performed with respect to the fourth and subsequent peaks of a histogram.

Figure 18A:
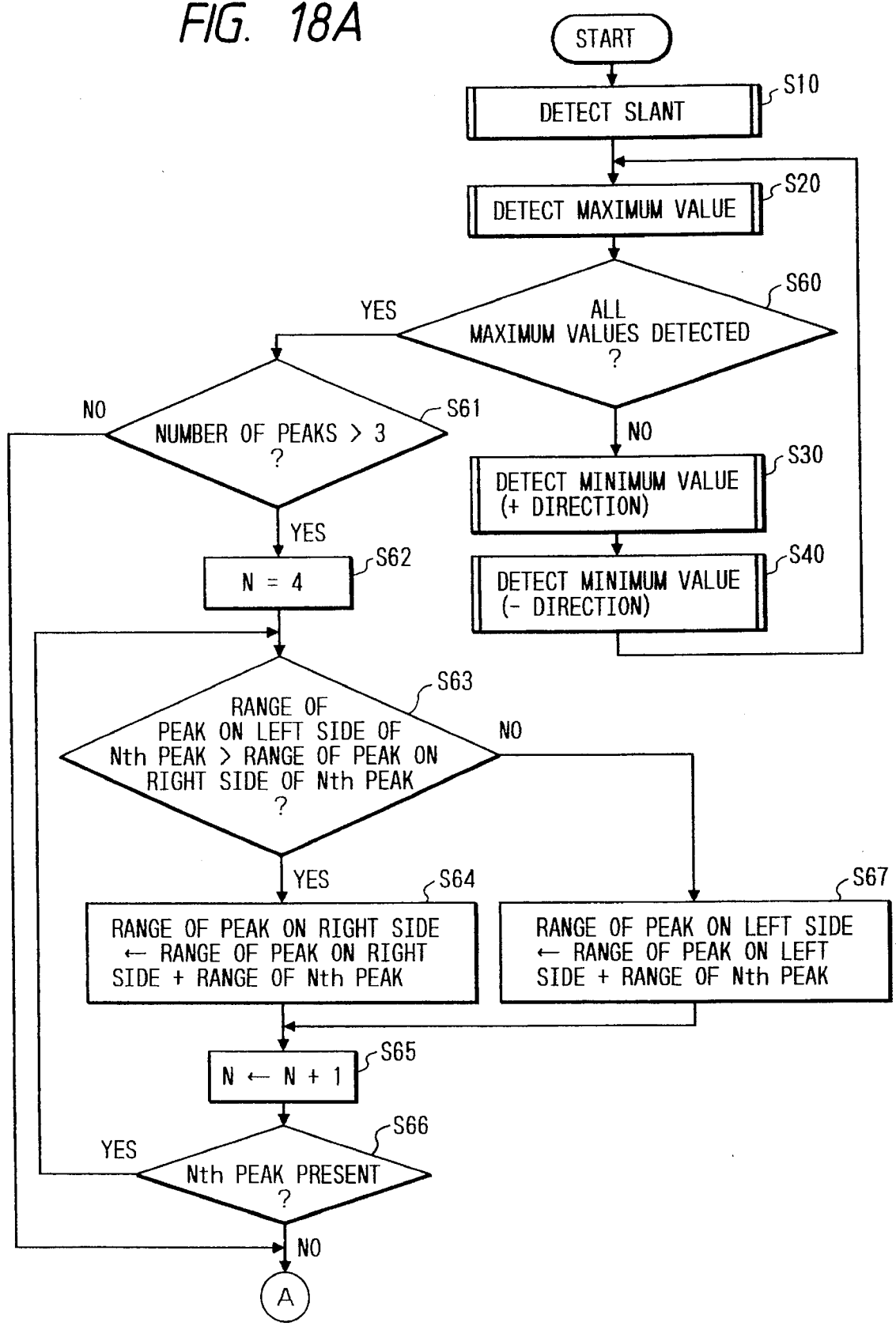
FIGS. 18A and 18B are flow charts showing a procedure for determining threshold values.
Figure 18B:
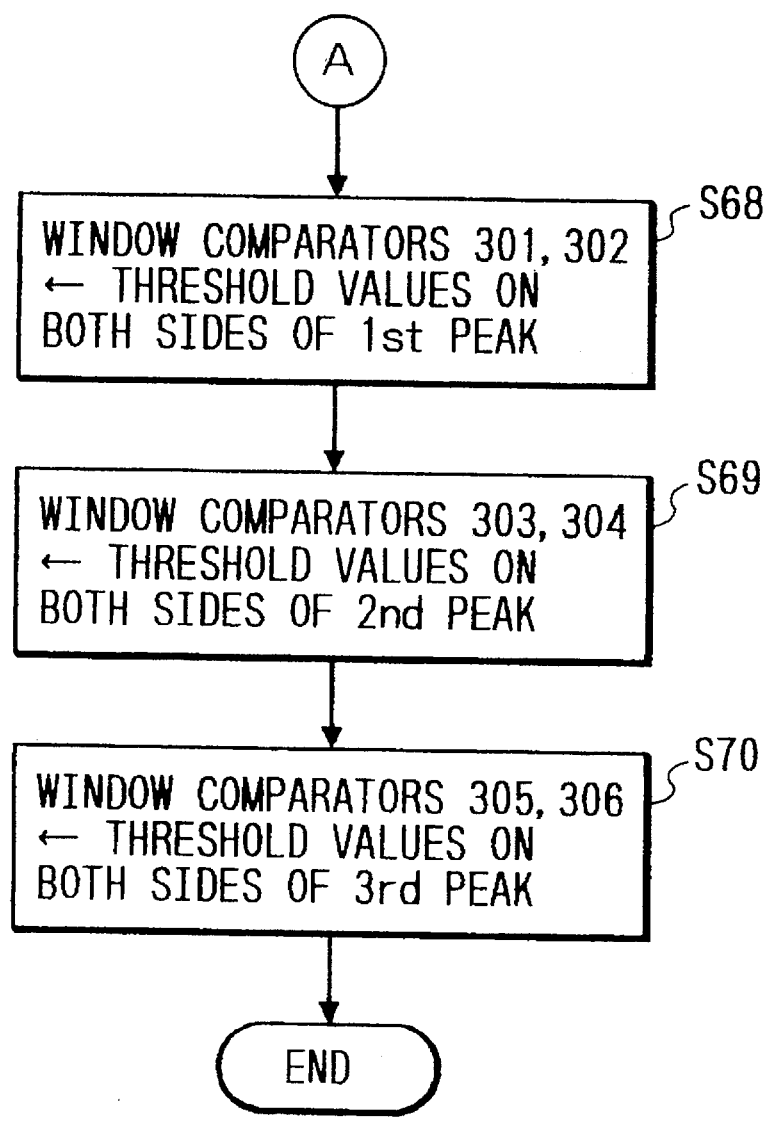

FIGS. 18A and 18B are flow charts showing a procedure for determining threshold values. Since the processing in steps S10 to S40 are described above, a detailed description thereof will be omitted. In step S20 to S40, a peak, i.e., a maximum value, in a hue value histogram is detected. In addition, processing of detecting the range of the peak, i.e., a minimum value, is performed. When all the peaks to be detected, i.e., the maximum values, are detected by repeating this processing (step S60), the maximum value and minimum value detection processing is terminated, and it is checked whether the number of peaks is larger than three (step S61). If it is determined in step S61 that the number of peaks is larger than three, a counter N is initialized to "4" (step S62). The range of the peak on the left side of the Nth peak is compared with the range of the peak on the right side of the Nth peak (step S63). If the range of the peak on the left side is larger, the range of the peak on the right side and the range of the Nth peak are added together to form a new range (step S64). The counter N is then incremented by one (step S65). If there is the Nth peak, the flow advances to step S63 (step S66). If it is determined in step S63 that the range of the peak on the right side is larger, the range of the peak on the left side and the range of the Nth peak are added together to form a new range (step S67). The flow then advances to step S65. If it is determined in step S66 that no Nth peak is present, i.e., the processing of generating three range data from the range data of all the peaks is completed, threshold values on both sides (+ and − directions) of the first peak are respectively set in the window comparators 301 and 302 (step S68). Threshold values on both sides of the second peak are respectively set in the window comparators 303 and 304 (step S69). Threshold values on both sides of the third peak are respectively set in the window comparators 305 and 306 (step S70). With this operation, the processing is ended.

This processing will be described with reference to FIG. 17. In processing of the range (K–L) of the fourth peak, the range width (B–C) of the first peak and the range width (H–I) of the third peak are compared with each other. Since the range width (B–C) is larger than the range width (H–I), the range width of the third peak is set to be the range between the positions C and I. That is, the threshold value at the position B is set in the window comparator 301; the threshold value at the position C, in the window comparator 302; the threshold value at the position E, in the window comparator 303; the threshold value at the position F, in the window comparator 304; the threshold value at the position K, in the window comparator 305; and the threshold value at the position I, in the window comparator 306.

Furthermore, referring to FIG. 17, the ranges between the positions B and H, and the positions C and I may be set as the first and second ranges, respectively, so that the color pattern between the positions L and K may be a synthetic pattern obtained by synthesizing the patterns between the positions B and C, and the positions H and I.

As has been described above, according to the present invention, the original 100 is pre-scanned to form a hue value histogram, and threshold values are set at positions where accumulated hue values are small in the histogram. A histogram area between a pair of threshold values belongs to any one of the three color areas, i.e., the mountain-like R, G, and B hue value distribution areas. Therefore, color detection can be accurately and reliably performed to prevent a region with a single color, which is to be converted into one pattern, from being converted into a patterned area and a non-patterned area, and also prevent the worst error, i.e., the omission of color data. That is, the present invention can reproduce areas, of a color original, which have the same color, as an easy-to-see pattern having a single color.

The present invention is not limited to a copying machine and can be applied to a reader, a printer, a facsimile apparatus, and the like.

In addition, the present invention can be applied to not only patterning but also color conversion processing.

What is claimed is:

1. An image processing apparatus comprising:

image processing means for processing input image data having a color value between first and second color values, said first and second color values defining a range of color;

count means for counting generation frequencies of the respective color values of the input image data; and determining means for determining the first and second color values on the basis of a count result obtained by said count means.

2. An apparatus according to claim 1, wherein said count means forms a histogram.

3. An apparatus according to claim 2, wherein said count means smoothes the histogram.

4. An apparatus according to claim 1, wherein the color values are hue values.

5. An apparatus according to claim 1, wherein said image processing means converts the image data between the first and second color values into a predetermined pattern image.

6. An apparatus according to claim 5, further comprising recording means for recording the image data, obtained by said image processing means, on a recording medium.

7. An apparatus according to claim 6, wherein said recording means records the image data in a single color.

8. An apparatus according to claim 1, further comprising read means for reading an image, wherein said image processing means processes the image read by said read means.

9. An apparatus according to claim 8, wherein said read means pre-reads an image, and said count means counts the respective color values of the pre-read image.

10. An image processing apparatus comprising:

image processing means for processing input image data having a color value between first and second color values, said first and second color values defining a range of color;

statistics means for collecting statistics of generation frequencies of the respective color values of the input image data;

determining means for determining two valley values, located on both sides of a peak value of the statistics of the data collected by said statistics means, as the first and second color values; and correcting means for, when a small peak value is present adjacent to a large peak value of the statistics of the data collected by said statistics means, performing a correction to set valley values, located on both sides of the large and small peak values, as the first and second color values.

11. An apparatus according to claim 10, wherein said image processing means converts the image data between the first and second color values into a predetermined pattern image.

12. An image processing apparatus comprising:

image converting means for converting an input image having a color value between first and second color values into a first image and converting an input image having a color value between third and fourth color values into a second image, said first, second, third and fourth color values defining a range of color; and determining means for determining the first, second, third and fourth color value in accordance with the color value of the input image, wherein said image converting means converts the input image between the first and second color values into a predetermined pattern image.

13. An image processing apparatus comprising:

image processing means for processing input image data having a color value between first and second color values, the first and second values defining a range of color;

statistics means for collecting statistics of generation frequencies of the respective color values of the input image data;

determining means for determining two valley values, located on both sides of a peak value of the statistics of the data collected by said statistics means, as the first and second color values when a number of peaks in the statistics is not greater than a predetermined number, and for determining two valley values located on both sides of the large and small peak values, as the first and second color values when the number of peaks in the statistics is greater than the predetermined number.

14. An apparatus according to claim 13, wherein said image processing means converts the image data between the first and second color values into a predetermined image.

15. An image processing apparatus comprising:

image converting means for converting an input image having a color value between first and second color values into a first image and converting an input image having a color value between third and fourth color values into a second image, said first, second, third and fourth color values defining a range of color;

count means for counting generation frequencies of the respective color values of the input image; and determining means for determining the first, second, third and fourth color values on the basis of a count result obtained by said count means, wherein said determining means determines two color values of low generation frequencies, which are located on both sides of a color value of a high generation frequency, as the first and second color values.

16. An image processing method comprising the steps of:

counting generation frequencies of respective color values of an input image;

determining first, second, third and fourth color values on the basis of a count result, said first, second, third and fourth color values defining a range of color; and converting the input image having a color value between the first and second color values into a first image and converting an input image having a color value between the third and fourth color values into a second image.

17. A method according to claim 16, wherein a histogram is formed by a count means in said counting generation frequencies step.

18. A method according to claim 17, wherein the histogram is smoothed upon forming the histogram by said count means.

19. A method according to claim 16, wherein the color values are hue values.

20. A method according to claim 16, further comprising the step of recording the first image and the second image, obtained in said image converting step, on a recording medium.

21. A method according to claim 20, wherein the first image and the second image are recorded in a single color in said recording step.

22. An image processing method comprising the steps of:

collecting statistics of generation frequencies of the respective color values of input image data;

determining two valley values, located on both sides of a peak value of the statistics of the data collected by said statistics means, as the first and second color values, said first and second values defining a range of color;

performing correction to set valley values, located on both sides of the large and small peak values, as the first and second color values, when a small peak value is present adjacent to a large peak value of the statistics of the data collected in said collecting step; and processing input image data having a color value between first and second color values.

23. A method according to claim 22, wherein the image data between the first and second color values is converted into a predetermined pattern image in said processing step.

24. An image processing method comprising the steps of:

determining first, second, third and fourth color values in accordance with a color value representing an input image, the first, second, third and fourth color values defining a range of color; and converting an input image having a color value between the first and second color values into a first image and converting an input image having a color value check between the third and fourth color values into second image, wherein the input image between the first and second color values is converted into a predetermined pattern in said converting step.

25. An image processing method comprising the steps of:

collecting statistics of generation frequencies of respective color values of input image data;

determining two valley values, located on both sides of a peak value of the statistics of the data collected in said collecting step, as first and second color values when a number of peaks in the statistics is not greater than a predetermined number, the first and second color values defining a range of color;

determining two valley values, located on both sides of the large and small peak values, as the first and second color values, when a number of peaks in the statistics is greater than the predetermined number; and processing input image data having a color value between the first and second color values.

26. A method according to claim 25, wherein the image data between the first and second color values is converted into a predetermined pattern image in said processing step.

27. An image processing method comprising the steps of:

counting generation frequencies of the respective color values of an input image data;

determining first and second color values on the basis of a count result, said first and second color values defining a range of color;

processing the input image data having a color value between the first and second color values; and reading an image, wherein the image read in said reading step is processed in said processing step.

28. A method according to claim 27, wherein an image is pre-read in said reading step, and the respective color values of the pre-read image is counted in said counting step.

29. An image processing method comprising the steps of:

counting generation frequencies of the respective color values of an input image data;

determining first and second color values on the basis of a count result, said first and second color values defining a range of color; and processing the input image data having a color value between the first and second color values, wherein the image data between the first and second color values is converted into a predetermined pattern image in said processing step.

* * * * *

UNITED STATES PATENT AND TRADEMARK OFFICE
CERTIFICATE OF CORRECTION

PATENT NO. : 5,612,793

DATED : March 18, 1997

INVENTORS : AKIO ITO, ET AL.

It is certified that error appears in the above-identified patent and that said Letters Patent is hereby corrected as shown below:

COLUMN 3

Line 29, "need" should read --needs--.

COLUMN 4

Line 38, "advances" should be deleted.

COLUMN 9

Line 17, "value" should read --values--.

COLUMN 11

Line 15, "is" should read --are--.

Signed and Sealed this

Twenty-sixth Day of August, 1997

Attest:

BRUCE LEHMAN

Attesting Officer     Commissioner of Patents and Trademarks